United States Patent [19]

Fransham

[11] Patent Number: 4,829,045
[45] Date of Patent: May 9, 1989

[54] PEAT PELLETS

[75] Inventor: Peter B. Fransham, Calgary, Canada

[73] Assignee: Nova-Huskey Research Corporation, Ltd., Alberta, Canada

[21] Appl. No.: 882,283

[22] Filed: Jul. 7, 1986

[51] Int. Cl.$^4$ .............................................. B01J 20/24
[52] U.S. Cl. ....................................... 502/401; 44/32; 210/242.4
[58] Field of Search ............................ 44/32, 32.1, 33; 502/401; 210/242.4, 924

[56] References Cited

U.S. PATENT DOCUMENTS

| | | | |
|---|---|---|---|
| 737,023 | 8/1903 | Rockwell | 44/32 |
| 2,163,860 | 6/1939 | White | 44/32 |
| 3,791,990 | 2/1974 | Fischer | 502/401 |
| 4,206,080 | 6/1980 | Sato et al. | 502/401 |

FOREIGN PATENT DOCUMENTS

| | | | |
|---|---|---|---|
| 1160201 | 1/1984 | Canada | 502/401 |
| 2010500 | 10/1970 | Fed. Rep. of Germany | 210/924 |
| 979453 | 4/1951 | France | 44/32 |
| 572866 | 3/1933 | German Democratic Rep. | 44/32 |
| 717122 | 2/1980 | U.S.S.R. | 44/32 |
| 12003 | of 1915 | United Kingdom | 44/32 |

Primary Examiner—Carl F. Dees
Attorney, Agent, or Firm—Bernard, Rothwell & Brown

[57] ABSTRACT

Peat is provided in the form of pellets for use in absorbing liquids and breaking emulsions. The hydrophilic/hydrophobic properties of the pellets may be varied, depending on the manner of drying. Calcium sulphate may be used as a binder, fire-retardant, absorbency enhancement, and emulsion breaker.

11 Claims, 3 Drawing Sheets

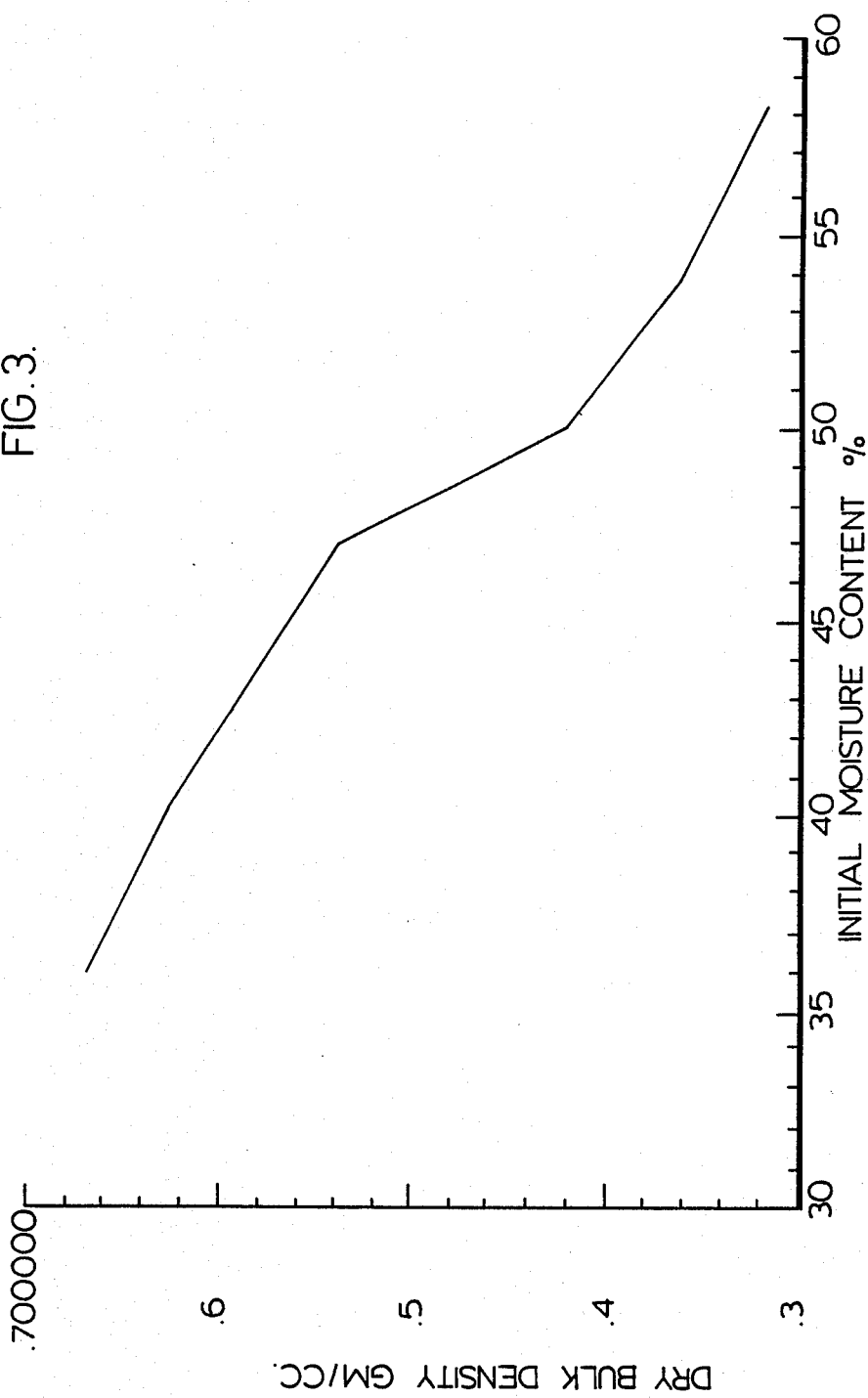

PEAT PELLETS

FIELD OF INVENTION

The present invention relates to pellets formed from peat.

BACKGROUND TO THE INVENTION

Oil film contamination of water bodies can cause heavy damage to aquatic life since the oil film retards penetration of oxygen into the water and oil washed up on beaches can destroy foreshore marine life.

A variety of proposals have been made to remove oil films from water. One such method involves the use of oil-absorbent materials which can be spread onto and float on the oil covered water to absorb the oil film. The oil-absorbent material then can be retrieved and the oil recovered or otherwise disposed of.

It has previously been suggested to employ peat in powdered form as such an oil-absorbent material. Peat, however, is hydrophilic in the natural state and hence, although peat absorbs oil on the surface of the water, a quantity of water also is absorbed, often causing the peat to sink. Accordingly, it has been considered necessary, therefore, to increase the hydrophobicity of the peat for use as an oil absorbent.

One such proposal is contained in Canadian Pat. No. 956,928 wherein it is indicated that peat with a decreased moisture content becomes hydrophobic and, accordingly, the patent proposes to decrease the water content of peat to below 10 wt. % for use as an oil-absorbent material.

Another proposal is contained in Canadian Pat. No. 1,160,201, wherein peat, at its natural moisture content of about 60 to 80 wt. %, is mixed with an alkaline earth metal material, notably calcium carbonate, the peat is partially dried to a moisture content of about 25 to 35 wt. %, the partially dried peat is mixed with further alkaline earth metal material, and the treated peat is dried further to a final moisture content of about 5 to 10 wt. %. The product is said to have a high hydrophobicity and to be capable of absorbing up to 20 times its own weight in oil. Treated peat prepared in accordance with this process is commercially available under the trade name "OCLANSORB" from Hi-Point Peat Ltd., Newfoundland, Canada.

Although hydrophobic peat is effective in absorbing oil from oil-contaminated water bodies and from other oil-contaminated surfaces without the concomitant problem of water absorbtion, a major problem lies in the physical form of the peat, namely its dry powder form. The dry peat is light and readily becomes airborne, rendering it often difficult to apply effectively to a large body of open water without significant wind losses, and also providing a significant fire hazard on storage and during indoor use.

SUMMARY OF INVENTION

In accordance with the present invention, these prior art problems are overcome by providing peat in the form of pellets. By providing the peat in pelletized form, the prior art problems of wind-borne losses and the fire hazard of dry powdered material are overcome, albeit at a moderate loss of absorbency.

The peat pellets may be formed using any desired pelletizing procedure. Generally, the peat is provided at an intermediate moisture level, generally in the range of about 35 to about 60 wt. %, pellets are formed from the peat at the intermediate moisture level, and the pellets are dried to the final moisture content, generally about 5 to about 10 wt. %.

It has been surprisingly found that the manner of drying the peat affects the absorbency characteristics of the product. If the peat is oven dried at a temperature of at least about 100° C. to its final moisture content, the product is hydrophobic as well as possessing oil absorbency properties while, if the peat is air dried at a temperature below about 100° C. to its final moisture content, the product is hydrophilic, as well as possessing oil absorbency properties.

This choice of properties enables the peat pellets to be employed in a variety of absorbency operations. When the peat pellets are hydrophobic, the pellets may be used to absorb organic materials, such as oils, while the absorption of water is inhibited. When the peat pellets are hydrophilic, the pellets also may be used to absorb aqueous media, such as in a kitty litter application or in the clean-up of acid spills, or may be used as a garden mulch.

It has further surprisingly been found that the inclusion of calcium or other alkaline earth metal sulphate in the pellets enhances the absorbency characteristics of the pellets and introduces fire retardancy in the pellets. The calcium carbonate additive suggested in Canadian Pat. No. 1,160,203 does not achieve either result in the pellets of the invention.

The calcium sulphate also acts as a binder to enhance the integrity of the pellets. Another useful property that the presence of the calcium sulphate introduces is the ability to break oil-in-water emulsions. Such pellets then are useful in the treatment of emulsions to break the same and absorb the resulting freed oil.

When such calcium sulphate, or other alkaline earth metal sulphate, is present, quantities may vary widely, generally from about 1 to about 35 wt. %, preferably about 5 to about 25 wt. %.

BRIEF DESCRIPTION OF DRAWINGS

FIG. 3 is a graphical representation of the change in bulk density of air-dried peat pellets with initial moisture content.

GENERAL DESCRIPTION OF INVENTION

Figure 1:
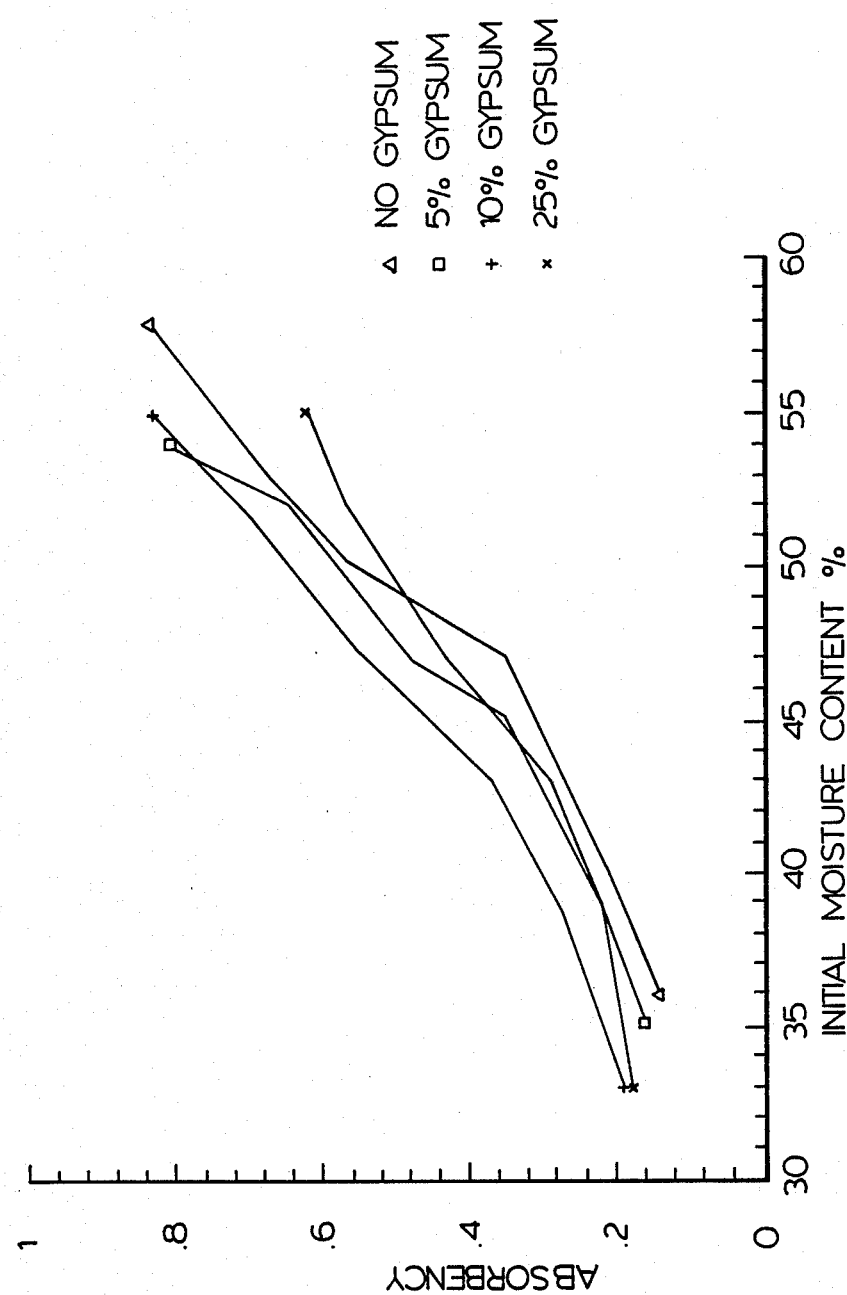
FIG. 1 is a graphical representation of the variation of oil absorbency with gypsum content and initial moisture content in air-dried peat pellets.

Muskeg forms a significant proportion of the landmass of Canada, about 12 percent, and comprises a surface mat of mosses, sedges and/or grasses, beneath which is a mixture of partially decomposed and disintegrated organic material, commonly referred to as "peat".

Peat can vary widely in its physical characteristics and three types have been identified, namely material composed chiefly of soils of an amorphous granular base, material chiefly made up of fine fibres and material predominantly of wood particles and coarse fibres. Within this broad classification, sixteen categories of peat have been identified, ranging from the coarsest woody, coarse-fibrous peat containing scattered wood chunks to the finest amorphous-granular peat. The present invention is useful with all types of peat, but has particular application to types which are predominantly fibrous in character, since peat in this form is readily formed into useful pellets.

The peat is provided at an intermediate moisture level of about 30 to about 60 wt. %, typically about 50 to 55 wt. %. This moisture level may be achieved by drying the peat from its natural moisture level or by moistening previously-dried peat. At this moisture level the peat may be readily pelletized using a pellet mill. Calcium sulphate may be added to the peat prior to pelletizing to assist in binding the peat and also to act as a fire retardent and to affect the absorbency characteristics of the pellets. Other materials may be used as binders for the pellets in place of the calcium sulphate, as desired, for example, bentonites and lignosulphonates. Surfactants also may be added to decrease oil absorbency.

The bulk density and absorbency properties of the pellets are affected by the initial moisture content of the peat. As the initial moisture content of the peat which is pelletized increases, the bulk density of the peat pellets obtained decreases. As the bulk density of the pellets decreases, the absorbency of the pellets increases. Addition of calcium sulphate increases the bulk density. With increasing moisture content, the quality of the pellet in terms of pellet strength decreases while the volume of fines produced increases. The greater the strength of the pellets, the more resistant the pellets are to disintegration upon subsequent handling.

The pellets may be provided in any desired size convenient to handling and the desired end use. Generally, the pellets may have a diameter from about ⅛ to about ½ inch and a length to diameter ratio of about 0.5:1 to about 2:1.

The pellets then are dried to their final moisture content of about 5 to about 10 wt. %. As noted previously, peat naturally possesses oil absorbency. The manner of drying, however, affects the other properties obtained. Oven drying at a temperature above about 100° C. imparts hydrophobicity to the pellets, while the oil absorbency properties remain.

Air drying of the peat pellets at a temperature of below about 100° C. to the final moisture content does not impart hydrophobicity to the pellets and the predominantly hydrophilic properties are retained along with the oil absorbency properties. By choice of the specific variables, desired water/oil absorbency properties may be provided in the product.

The peat pellets of the present invention may be put to a variety of uses. Pellets having predominantly hydrophobic properties may be used to absorb organic liquids, for example, oil spills from aquatic bodies, without the attendent dusting and flammability problems of the prior art.

The peat pellets which have hydrophilic properties are also useful in treating oil contaminated waste water. Hydrocarbon-contaminated waste water is produced as a by-product of oil recovery and generally is unsuitable for any purpose other than injecting back into the reservoir or into another geological formation. Long term disposal of such waste water is a problem due to reservoir plugging by the contaminated water.

As to the formation plugs, injectivity decreases and the volume of water then can be disposed of per unit time decreases. Ultimately the capacity of the formation to take up water is less than the volume that must be disposed of. At this point, the well must be serviced or a new well drilled, both costly alternatives.

Oil/water emulsions are frequently used in machining. Such emulsions have a finite life and, after a period of time, lose their effectiveness as cutting oils in the fabrication of metal parts. Prior to disposal, most cutting oils are treated with acid in holding tanks, breaking the emulsion. The oil floats to the top of the tank and is decanted, while the water is disposed of into the sewage system. This procedure suffers from the physical space requirements of the holding tanks and the necessity for a long holding time to permit the emulsion to break and separate.

In accordance with one aspect of the present invention, the peat pellets of the invention are utilized to remove free hydrocarbon from contaminated water and, when the peat pellets also contain calcium sulphate or other alkaline earth metal sulphate, to break oil/water emulsions. In this aspect of the invention, the material to be treated is passed through a bed or a series of beds of peat pellets. As the aqueous medium passes through the bed, emulsions are broken by the calcium sulphate and the hydrocarbon phase is absorbed by the peat pellets, to provide a clean aqueous product. Peat pellets having hydrophilic properties are particularly useful in this aspect of the invention.

The peat pellets of the invention having hydrophilic properties also may be used as an absorbent for aqueous media. For example, the pellets may be used as a kitty litter product in place of the clay-based products used commercially. Hydrophilic peat pellets also can be used to clean up aqueous chemical spills, for example, acid spills.

In addition, hydrophilic peat pellets from which a binder is absent tend to disintegrate and return to their original fibrous form when contacted with water. For this reason, such hydrophilic peat pellets have horticultural use as a garden mulch, which can be readily distributed and then disintegrates to fibrous form upon exposure to water.

EXAMPLES

EXAMPLE 1

A series of experiments was carried out to investigate the relationship between initial moisture content prior to pelletization, calcium sulphate content of the pellets, bulk density of pellets and the oil/water absorbency properties of the pellets. The experiments were performed on peat from Alberta, Canada which was classified as fibrous. The peat had an initial water content of 35% and water was added to the pelletization moisture level. The peat was pelletized to pellets dimensioned ¼ inch using a laboratory pelletizer and the pellets were air dried at a temperature of about 22° C. to a final moisture content of about 8 wt. %.

The oil absorbency results were plotted graphically and appear as FIG. 1. As may be seen from this data, the higher the initial moisture, the more absorbent the final pellet with oil absorbency increasing from a low of 0.2 to a high of 0.85 for moisture contents of 34 and 55% respectively. In addition, the data shows that the presence of the calcium sulphate also affects oil absorbency to some degree.

Figure 2:
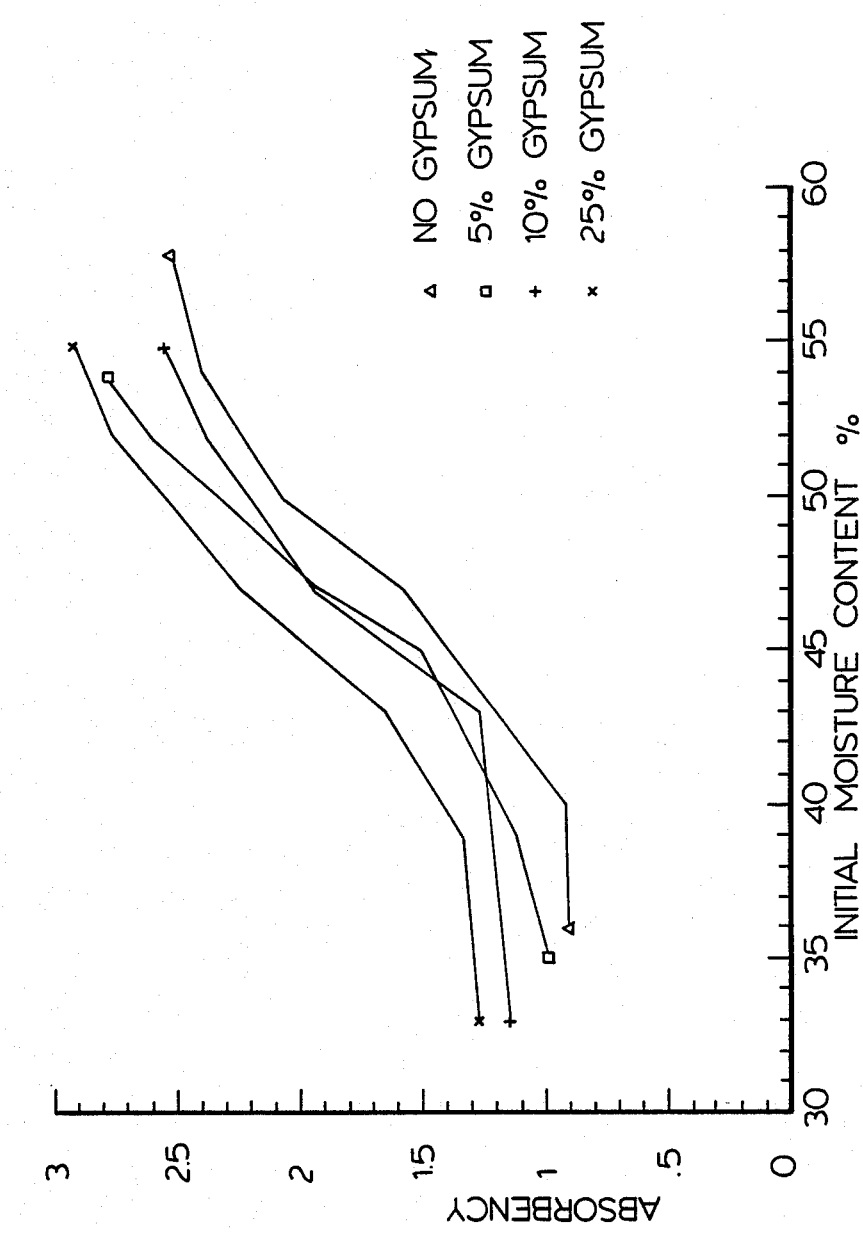
FIG. 2 is a graphical representation of the variation of water absorbency with gypsum content and initial moisture content in air-dried peat pellets.

The water absorbency results were plotted graphically and appear as FIG. 2. As may be seen from this data, the water absorbency properties are significantly higher than for oil, with the property again increasing with increasing moisture content of the pelletized peat.

Again, the presence of the calcium sulphate affects water absorbency to some degree.

In one experiment, air dried pellets were further dried at 100° C. for 24 hours and this heat treatment decreased the water absorbency of the pellets from 2.8 to 0.4 while the oil absorbency remained the same.

The bulk density of the pellets obtained in the absence of added gypsum was determined for variations in initial moisture content of the peat which is pelletized and the results plotted graphically as FIG. 3. As seen therein, as the initial moisture content increases, the bulk density decreases.

EXAMPLE 2

A laboratory filter arrangement was set up comprising a pair of cylinders each 10 cm in diameter and 60 cm long and filled with air dried peat pellets having a moisture content of about 8%, containing calcium sulphate in the amount of 5% and sized ¼ inch. Liquid was pumped up through the first filter bed, down through the second filter bed and then through a sand filter at the discharge end of the second filter bed to remove fine peat particles washed from the surface of the pellets.

The filter was tested with two liquids, namely Aberfeldy (Alberta, Canada) production water and a 10% cutting oil emulsion. The Aberfeldy production water was a black opaque liquid. 60 liters of this liquid were passed through the filter at a flow rate of 1 L/min. The discharge from the filter was transparent and light brown in colour, signifying substantial removal of hydrocarbons from the production water.

The cutting oil was an opaque white liquid. 10 liters of this liquid was passed through the filter at a flow rate of 1 L/min. The discharge from the filter was a pale transparent yellow liquid, signifying breaking of the emulsion and removal of the cutting oil. The yellow colour was thought to be imparted by humic acid and infrared analysis of the filtered water did not indicate any residual cutting oil in the water.

SUMMARY OF DISCLOSURE

In summary of this disclosure, the present invention provides peat in a novel form, namely pelletized form, which is useful in a variety of absorbency property applications. Modifications are possible within the scope of this invention.

What I claim:

1. Peat in the form of pellets which have been dried to a moisture content of less than about 10 weight % in such manner as to substantially retain the hydrophilicity of said peat.

2. The peat pellets of claim 1 which are heat treated to decrease the hydrophilicity of the pellets.

3. Peat in the form of pellets which have been dried to a moisture content of less than about 10 weight % in such manner as to render the peat substantially hydrophobic.

4. The peat pellets of claim 1 wherein said peat is substantially fibrous peat.

5. The peat pellets of claim 4 which have a diameter from about ⅛ to about ½ inch and a length to diameter ratio from about 0.5:1 to about 2:1.

6. A method of forming peat pellets suitable for use as an absorbent material, which comprises:
   providing peat at an intermediate moisture level of about 35 to about 60 wt. %,
   pelletizing the peat at said intermediate moisture level to provide peat pellets, and
   drying said peat pellets to a final moisture content of less than about 10 wt. %.

7. The method of claim 6 wherein said peat pellets are dried to the final moisture content by oven drying at a temperature of at least about 100° C., thereby to impart hydrophobicity to the pellets.

8. The method of claim 6 wherein said peat pellets are dried to the final moisture content by air drying at a temperature below about 100° C., thereby to retain hydrophilicity of the peat.

9. The method of claim 8 wherein said air dried pellets are heat treated at elevated temperature to decrease the hydrophilicity of the pellets.

10. The method of claim 6 wherein said peat is substantially fibrous peat.

11. A method for forming peat pellets suitable for use as an absorbent material which comprises peat which is substantially fibrous and having an intermediate moisture level of about 35 to 60 weight percent,
    pelletizing said peat at said intermediate moisture level to provide peat pellets having a diameter of from ⅛ inch to about ½ inch and a length to diameter ratio of about 0.5:1 to about 2:1, and
    air drying said peat pellets at a temperature of at least 100° C. thereby to impart hydrophobicity to the pellets and wherein said pellets have a final moisture content of about 5 to about 10 weight percent.

* * * * *